US012798546B2

(12) United States Patent
Yang et al.

(10) Patent No.: US 12,798,546 B2
(45) Date of Patent: Nov. 17, 2026

(54) METHOD AND DEVICE FOR MANAGING DISCHARGED WATER OF A MOVING OBJECT

(71) Applicants: HYUNDAI MOTOR COMPANY, Seoul (KR); KIA CORPORATION, Seoul (KR)

(72) Inventors: Tae Seon Yang, Seoul (KR); Byung Woo Jeon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 249 days.

(21) Appl. No.: 18/766,080

(22) Filed: Jul. 8, 2024

(65) Prior Publication Data

US 2025/0263060 A1 Aug. 21, 2025

(30) Foreign Application Priority Data

Feb. 15, 2024 (KR) ........................ 10-2024-0021906

(51) Int. Cl.
*B60W 10/28* (2006.01)
*B60W 10/30* (2006.01)

(52) U.S. Cl.
CPC ............ *B60W 10/30* (2013.01); *B60W 10/28* (2013.01); *B60W 2710/18* (2013.01); *B60W 2710/285* (2013.01)

(58) Field of Classification Search
CPC .. B60W 10/28; B60W 10/30; B60W 2710/18; B60W 2710/285
See application file for complete search history.

(56) References Cited

U.S. PATENT DOCUMENTS

2008/0063902 A1* 3/2008 Kawasaki ......... H01M 8/04358 429/10
2010/0227238 A1* 9/2010 Naganuma ........ H01M 8/04753 429/429
2014/0295302 A1* 10/2014 Ishikawa ........... H01M 8/04388 702/65
2018/0166710 A1* 6/2018 Lee ....................... F28D 20/021
2020/0153007 A1* 5/2020 Ryu .................. H01M 8/04225

* cited by examiner

*Primary Examiner* — Edwin A Young
(74) *Attorney, Agent, or Firm* — Lempia Summerfield Katz LLC

(57) ABSTRACT

A method for managing discharged water discharged from a moving object includes: receiving a setting request indicating whether or not to store the discharged water that is discharged due to electricity generation of a fuel cell; receiving, as a response to storing the discharged water, a utilization mode for using the discharged water as utilization water for specific use; setting a target water temperature of the utilization water based on the received utilization mode being set; adjusting the water temperature of the utilization water based on the target water temperature through heat exchange between a component constituting the moving object and the utilization water; and providing the utilization water according to the received utilization mode.

20 Claims, 10 Drawing Sheets

METHOD AND DEVICE FOR MANAGING DISCHARGED WATER OF A MOVING OBJECT

CROSS REFERENCE TO RELATED APPLICATION

The present application claims priority to Korean provisional patent application No. 10-2024-0021906, filed Feb. 15, 2024, the entire contents of which are incorporated herein for all purposes by this reference.

BACKGROUND OF THE DISCLOSURE

Technical Field

The present disclosure relates to a method and device for managing water discharged by a moving object, and more particularly, to a method and device for managing water discharged by a moving object for utilizing discharged water and excess power generated by electricity generation of a fuel cell.

Description of the Related Art

Electric powered moving objects such as electric cars using electricity generated by fuel cells have high regenerative outputs generated by regenerative braking but relatively low battery charging capacities. A resulting limitation is that not all of the power acquired by regenerative braking is used to charge the battery.

Accordingly, in order to consume the excess power not usable for charging the battery, various electronic devices of the moving objects like a water pump module (WPM), a heater, and a brake register are controlled to use the excess power.

On the other hand, in recent years, fuel cell-powered moving objects that use hydrogen as a fuel are being manufactured to generate water as a by-product of the electricity generation of fuel cells. The fuel cell-powered moving objects that use hydrogen as a fuel discharge the by-product water out of the moving objects without a separate processing procedure.

In addition, when a fire breaks out in an electric moving object, even if a fire extinguisher inside the moving object is used, the fire is difficult to put out immediately at an early stage. Further, when a commercial vehicle has no firefighting equipment, such a fire is much more difficult to put out and may develop into a man-made catastrophe.

In addition, as commercial moving objects are frequently driven for a long time, water supply equipment is required in the moving objects to relieve the drivers' fatigue.

Therefore, a system for using excess power in an electric moving object is required in order to use water, which is a by-product of electricity generation of a fuel cell, in a fire situation and to supply water in response to a driver's request when the electric moving object is a commercial moving object that is frequently operated for long durations.

SUMMARY

The present disclosure is directed to providing a method and device for managing utilization water of a moving object such that utilization water and excess power generated by electricity generation of a fuel cell may be used.

The technical problems solved by the present disclosure are not limited to the above described technical problems.

Other technical problems that are not described herein should be more clearly understood by a person having ordinary skill in the technical field to which the present disclosure belongs from the following description.

According to the present disclosure, a method is provided for managing discharged water discharged by a moving object. The method may include: receiving a setting request indicating whether or not to store discharged water that is discharged due to electricity generation of a fuel cell; receiving, in response to storing the discharged water, a utilization mode for using the discharged water as utilization water for specific use; setting a target water temperature of the utilization water based on the received utilization mode; adjusting a water temperature of the utilization water based on the target water temperature through heat exchange between a component constituting the moving object and the utilization water; and providing the utilization water according to the received utilization mode.

According to another embodiment of the present disclosure, a mobility device is provided for managing discharged water of a moving object. The device may include a memory configured to store at least one instruction and a processor configured to execute the at least one instruction stored in the memory based on data obtained from the memory. The processor may be further configured to: receive a setting request indicating whether or not to store discharged water that is discharged due to electricity generation of a fuel cell; receive, in response to storing the discharged water, a utilization mode for using the discharged water as utilization water for specific use; set a target water temperature of the utilization water based on the received utilization mode, adjust a water temperature of the utilization water based on the target water temperature through heat exchange between a component constituting the moving object and the utilization water; and provide the utilization water according to the utilization mode.

According to an embodiment of the method of the present disclosure, receiving the setting request indicating whether or not to store discharged water may set a discharge mode for discharging the discharged water to an outside of the moving object or a storage mode for storing the discharged water in a storage unit according to a user input.

According to an embodiment of the method of the present disclosure, receiving the utilization mode may include receiving a user input and setting a firefighter mode or a water supply mode.

According to an embodiment of the method of the present disclosure, setting the target water temperature may include checking whether or not the target water temperature is within a reference water temperature range of the utilization water according to the firefighter mode, when the firefighter mode is set according to the user input and may include setting the target water temperature according to the user input, when the target water temperature is within the reference water temperature range.

According to an embodiment of the method of the present disclosure, adjusting the water temperature of the utilization water may include adjusting the water temperature based on a target water temperature range that is generated by adding a buffer temperature set based on the target water temperature. The buffer temperature may be defined as a hysteresis value that absorbs error according to a water temperature measurement.

According to an embodiment of the method of the present disclosure, adjusting the water temperature of the utilization water may include heating the utilization water using one of waste heat of a coolant from a cooling process of the component constituting the moving object, regenerative waste heat generated from excess power generated by regenerative braking of the moving object, or fuel waste heat generated from power generated by the fuel cell.

According to an embodiment of the method of the present disclosure, the utilization water may be heated by the waste heat and, when it is predicted that the water temperature will not reach the target water temperature by being heated by the waste heat, the utilization water is also heated using at least one of the regenerative waste heat and the fuel waste heat.

According to an embodiment of the method of the present disclosure, heating the utilization water by the regenerative waste heat may include determining whether or not the regenerative waste heat is available for heating the utilization water by analyzing at least one of a battery charge limit of the moving object and route information of the moving object. When the regenerative waste heat is available, heating the utilization water may also include heating the utilization water using the regenerative waste heat.

According to an embodiment of the method of the present disclosure, heating the utilization water by the fuel waste heat may include heating the utilization water using the fuel waste heat when at least one of a plurality of fuel cell power generation conditions, which are based on a battery charge amount of the moving object, route information of the moving object, a residual fuel amount of the fuel cell, or a power generation requirement up to the target water temperature, is satisfied as a condition for utilizing the fuel waste heat.

According to an embodiment of the method of the present disclosure, heating the utilization water may further include calculating a required time to heat the utilization water according to heating by one of the waste heat, the excess power, and the power generated by the fuel cell.

According to an embodiment of the method of the present disclosure, heating the utilization water may further include receiving user option information regarding heating by the excess power and heating by the power generated by the fuel cell.

The features of the present disclosure, which are briefly summarized above, are only examples of aspects or features of the present disclosure and detailed description of the disclosure follows and are not intended to limit the scope of the present disclosure.

The technical problems solved by the present disclosure are not limited to the above mentioned technical problems. Other technical problems solved by the present disclosure, which are not described herein should be more clearly understood by a person having ordinary skill in the art or technical field to which the present disclosure belongs from the following description.

According to the present disclosure, a method and device for managing discharged water, discharged by a moving object may be provided to utilize discharged water and excess power generated by electricity generation of a fuel cell.

According to the present disclosure, firefighting water usable for a fire situation of an electric moving object may be provided.

According to the present disclosure, discharged water generated by electricity generation of a fuel cell may be supplied as utilization water according to a request of a driver.

According to the present disclosure, utilization water may be stored and managed at a water temperature and a water level that are set by a driver.

According to the present disclosure, excess power and waste heat generated from existing components mounted in an electric moving object may be utilized to store and manage utilization water at a water temperature and a water level that are set by a driver.

The effects obtainable from the present disclosure are not limited to the above-mentioned effects. Other effects not mentioned herein should be more clearly understood by those of ordinary skill in the art through the following description.

DETAILED DESCRIPTION OF THE DISCLOSURE

Figure 1:
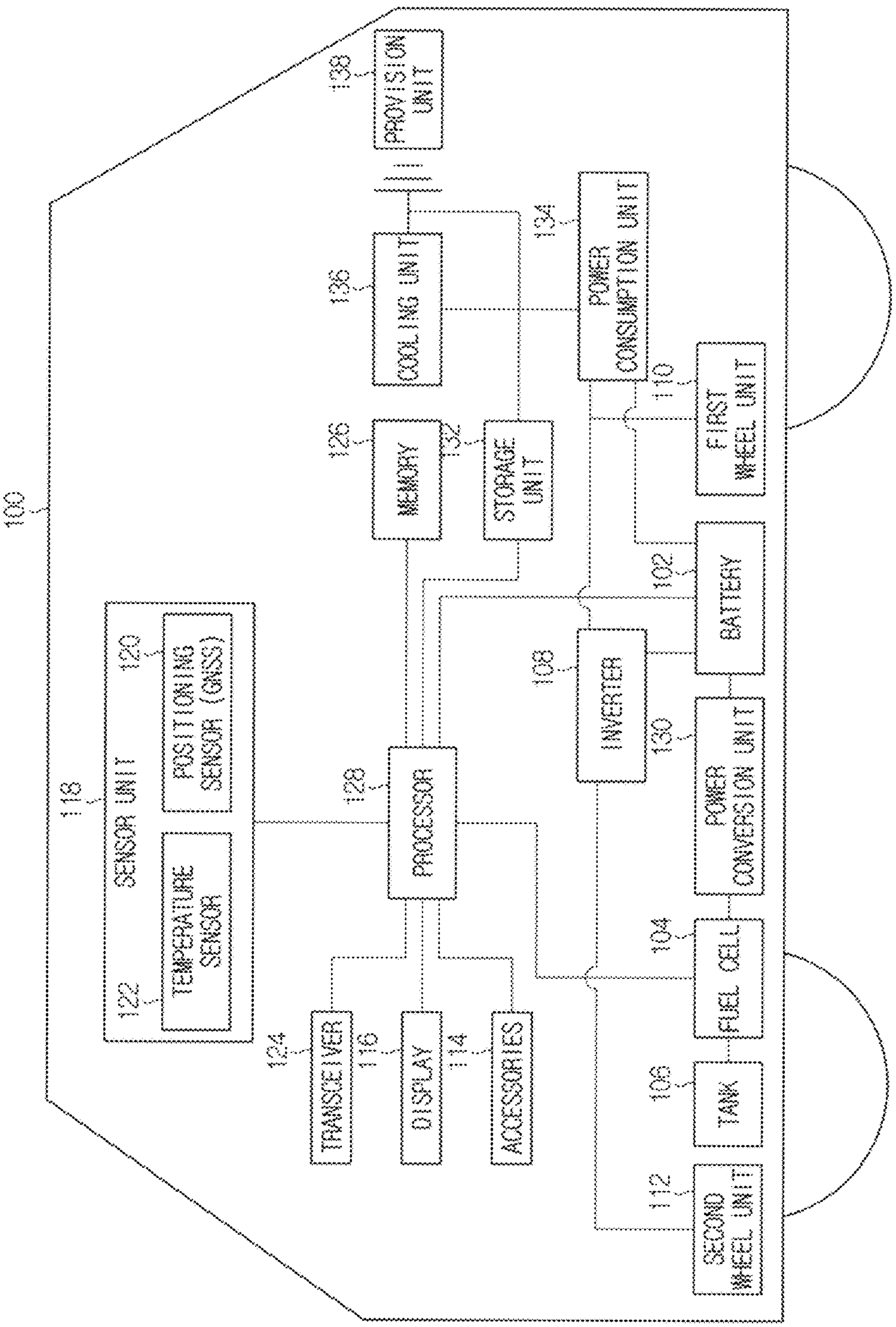
FIG. 1 is a schematic diagram showing constituent modules of a moving object equipped with a discharged water management device according to an embodiment of the present disclosure.

Hereinafter, embodiments of the present disclosure are described in detail with reference to the accompanying drawings so that those having ordinary skill in the art may easily implement the present disclosure. However, embodiments of the present disclosure may be implemented in various different ways and thus the present disclosure is not limited to the embodiments described therein.

In describing embodiments of the present disclosure, well-known functions or constructions have not been described in detail since a detailed description thereof may have unnecessarily obscured the gist of the present disclosure. The same constituent elements in the drawings are denoted by the same reference numerals and a repeated or duplicative description of the same elements has been omitted.

In the present disclosure, when an element is simply referred to as being "connected to", "coupled to" or "linked to" another element, this may mean that an element is "directly connected to", "directly coupled to", or "directly linked to" another element or this may mean that an element is connected to, coupled to, or linked to another element with another element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically stated otherwise. Accordingly, a first element in an embodiment could be termed a second element in another embodiment, and, similarly, a second element in an embodiment could be termed a first element in another embodiment, without departing from the scope of the present disclosure.

In the present disclosure, elements are distinguished from each other for clearly describing each feature, but this does not necessarily mean that the elements are separated. In other words, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present disclosure and the ways of attaining them should become apparent to those of ordinary skill in the art with reference to embodiments of the present disclosure described below in detail in conjunction with the accompanying drawings. The embodiments of the present disclosure, however, may be embodied in many different forms and should not be constructed as being limited to the example embodiments set forth herein. Rather, the embodiments described herein are provided to make this disclosure more complete and to fully convey the scope of the present disclosure to those having ordinary skill in the art to which the present disclosure pertains.

In the present disclosure, each of phrases such as "A or B", "at least one of A and B", "at least one of A or B", "A, B or C", "at least one of A, B and C", and each of the phrases such as "at least one of A, B or C" and "at least one of A, B, C or combination thereof" may include any one or all possible combinations of the items listed together in the corresponding one of the phrases.

In the present disclosure, expressions of location relations used in the present specification such as "upper", "lower", "left" and "right" are employed for the convenience of explanation, and when drawings illustrated in the present specification are inversed, the location relations described in the specification may be inversely understood. When a component, device, element, or the like of the present disclosure is described as having a purpose or performing an operation, function, or the like, the component, device, or element should be considered herein as being "configured to" meet that purpose or perform that operation or function.

Hereinafter constituent modules of a moving object equipped with a discharged water management device are described according to an embodiment of the present disclosure with reference to FIG. 1.

FIG. 1 is a schematic diagram showing constituent modules of a moving object equipped with a discharged water management device according to an embodiment of the present disclosure.

A moving object 100 may be driven using electric energy. Specifically, the moving object 100 may employ an electric battery, which is directly charged, or a gas-based fuel cell as energy source. As for the fuel cell, the moving object 100 may use various types of gas capable of generating electric energy in the fuel cell, and for example, the gas may be hydrogen. However, without being limited thereto, various gases may be applicable. The present disclosure describes the fuel cell-based moving object 100 as an example of an electric energy moving object.

For example, the moving object 100 may refer to a device capable of moving (e.g., under its own power). The moving object 100 may be a ground moving object driven on the ground or a vehicle as a mobility device and may be a normal passenger vehicle or commercial moving object, a mobile office, or a mobile hotel. The moving object 100 may be a four-wheel moving object or a mobility device such as a sedan, a sports utility vehicle (SUV), or a pickup truck. The moving object 100 may also be a moving object with five or more wheels or a commercial vehicle such as a lorry, a moving object carrying a container, or a moving object carrying heavy machinery. The moving object 100 may be a manned or unmanned robot using a plurality of batteries such as a robot device for construction machinery.

In addition, the moving object 100 is not limited to the ground moving object and may be, for example, an aerial moving object using a plurality of batteries or a water moving object for water transportation. The aerial moving object may include a manned or unmanned flying object, and the unmanned flying object may be, for example, a drone or a personal aerial vehicle (PAV). The water moving object may be a ship or submarine that is operated manned or unmanned.

In addition, the moving object 100 is not limited to transportation on Earth but may be a moving object for space operating in space outside Earth such as an exploration robot on the surface of the moon using a plurality of batteries and a spacecraft using a plurality of batteries.

The moving object 100 may be implemented by manual operation or autonomous driving (either semi-autonomous or full-autonomous driving).

Meanwhile, the moving object 100 may perform communication with another device or another moving object. Herein, as an example, the moving object may perform communication with another device based on cellular communication, wireless access in vehicular environment (WAVE) communication, dedicated short range communication (DSRC) or any other communication scheme. In other words, LTE as a cellular communication network, a communication network such as 5G, a WiFi communication network, a WAVE communication network, and the like may be used. In addition, a short range communication network like DSRC may be used in the moving object and the moving object 100 is not limited to the above-described embodiments.

Hereinafter, for convenience of explanation, the moving object 100 is described as a vehicle operating on the ground to describe embodiments according to the present disclosure. However, embodiments of the present disclosure may be applied to the above-described various types of moving objects, for example, aerial moving objects, water moving objects, and moving objects for space.

Specifically, the moving object 100, illustrated in FIG. 1 as a vehicle may include a battery 102, a fuel cell 104, a first wheel unit 110, a second wheel unit 112, accessories 114, a display 116, a sensor unit 118, a transceiver 124, a memory 126, a processor 128, a power conversion unit 130, a storage unit 132, a power consumption unit 134, a cooling unit 136, and a provision unit 138. Each of the above-described components is not a necessary component, and one or more components may be omitted. In addition, other components apart from the above-described components may be included.

The battery 102 may be charged by electricity generation of the fuel cell 104. The battery 102 may also supply necessary power to a module of the moving object 100. For example, the battery 102 may supply power required for starting the moving object 100 and may supply energy for driving the moving object 100 and operating the accessories 114. Specifically, the battery 102 may provide energy, which is applied from the fuel cell 104, to start, drive, light, and air-condition the moving object 100. The battery 102 may provide energy to various electrical devices of the moving object 100. The battery 100 may output a higher voltage than the fuel cell 104 and supply energy to, for example, a drive wheel and a high-power electric module.

The fuel cell 104 may include a hydrogen fuel cell equipped with a plurality of stacks that generate electric energy through reaction between hydrogen supplied from a tank 106 and oxygen coming from outside. In addition, the fuel cell 104 may supply energy to a low-power electric module, as well as charge the battery 102. In addition, the fuel cell 104 may provide electric energy for raising the temperature of utilization water, which is described below.

The power conversion unit 130 may be a converter that serves as a buck-booster converter. In the present disclosure, the power conversion unit 130 may be described by a term referring to a power conversion device. The power conversion unit 130 may convert and supply voltage from the fuel cell 104 to the battery 102, thereby charging the battery 102. Depending on an operating situation, the power conversion unit 130 may supply power at a converted voltage to motors of the first wheel unit 110 and the second wheel unit 112 operating in a high voltage range and various electronic devices (for example, the accessories 114).

The moving object 100 may include an inverter 130, which transforms a specific form of power of the battery 102 to another form and reduces voltage, and at least one of the first wheel unit 110 and the second wheel unit 112, which is driven by power supplied from the inverter 130. The first wheel unit 110 and the second wheel unit 112 may be configured to have a power transmission system apart from wheels and motors. When at least one of the first wheel unit 110 and the second wheel unit 112 is a driving wheel, it may be equipped with a motor for transmitting a driving force to a wheel and a motor control module for controlling motor torque, a motor turning direction, and braking. The first wheel unit 110 and the second wheel unit 112 may include a motor control unit (MCU) as a motor control module and thus control excess power generated by regenerative braking. For example, excess power may be controlled to charge the battery 102, or according to the present disclosure, excess power may be provided to the power consumption unit 134 to heat utilization water stored in the storage unit 132 as described below.

A motor provided in a wheel unit may be driven by power applied and supplied from the battery 102 via the inverter 108. The inverter 108 may convert a specific form of electric power of the battery 102, for example, alternating current to another form, for example, direct current and reduce a voltage.

The accessories 114 are auxiliary equipment mounted in the moving object 100 and may be, for example, a startup system, a drive transmission system, an air-conditioning system, and various devices installed in the moving object 100.

The display 116 may serve as a user interface. By the processor 128 (e.g., according to one or more control signals sent by the processor 128), the display 116 may display and output an operating state and a control state of the moving object 100, route/traffic information, battery condition, information on a remaining quantity of gas, content requested by a user, a time required to heat utilization water to a target water temperature and the like. The display 116 may be configured as a touch screen capable of sensing a user input and receiving a request of a user instructing the processor 128.

The sensor unit 118 may be equipped with various types of sensor modules for sensing various states and situations that occur in internal and external environments of the moving object. For example, the sensor unit 118 may include a positioning sensor 120 for measuring a position of the moving object 100 and a temperature sensor 122 for measuring an ambient temperature at a current location of the moving object 100 and a water temperature of utilization water stored in the storage unit 132. In addition, although not shown herein, the sensor unit 118 may include an image sensor for providing visual images of the outside and inside of the moving object, Lidar, a radar sensor, a distance sensor, an acceleration sensor, a wheel speed sensor, a gyro sensor, and a sensor for sensing a water level of utilization water stored in the storage unit 132. The present disclosure primarily describes sensors referred to for describing an embodiment of the present disclosure but may further include a sensor for detecting various situations not listed herein. For example, the sensor unit 118 may further include a fire detection sensor for detecting a fire situation and a collision detection sensor for detecting a collision of the moving object 100.

The positioning sensor 120 may measure a two-dimensional location and altitude of the moving object 100, when the moving object 100 is parked or running. For example, the positioning sensor 120 may be a GPS sensor, and the GPS sensor may measure a position of the moving object 100 based on information transmitted from a plurality of satellites. The positioning sensor 120 is not limited to a GPS sensor but may consist of multiple sensors combining the GPS sensor and another sensor. Specifically, the positioning sensor 120 may interchangeably use at least one GNSS and interchangeably use, for example, a GPS, Galileo, and QZSS.

The transceiver 124 may support mutual communication with a neighbor moving object of the moving object, an intelligent traffic service server or a roadside base station, a server for providing various types of moving object services, or an edge device. The moving object 100 may acquire neighbor station information from a weather station around the moving object. For example, the neighbor station information may include surrounding temperature profile information based on weather information as well as a surrounding latitude and a surrounding altitude according to a location of the weather station.

The memory 126 may store an application for controlling the moving object 100 and various data and load the application or read and record data at a request of the processor 128. In the present disclosure, the memory 126 may store an application and at least one instruction for achieving a target water temperature and a target water level of utilization water that is input by a user.

The processor 128 may perform overall control of the moving object 100. The processor 128 may be configured to execute an application and an instruction stored in the memory 126. The processor 128 may be equipped with at least one processing module. A function associated with each control may be implemented in one processing module or may be implemented in a corresponding processing module of a plurality of processing modules. In relation to the present disclosure, the processor 128 may use an application, an instruction and data stored in the memory 126 to check whether the storage unit 132 stores discharged water and to control an existing component, which is mounted in the moving object 100, as a heating device or a cooling device for adjusting the water temperature or water level of utilization water stored in the storage unit 132.

For example, as for the component, the cooling unit 136 may be included as a cooling device for cooling various devices in the moving object 100, and the power consumption unit 134 like a brake resister for transforming and consuming excess power as heat energy may be included. This is described below.

Specifically, in order to use discharged water generated by electricity generation of the fuel cell 104, the processor 128 may receive a setting request from a user for determining whether or not to store in the storage unit 132. In relation to the present disclosure, discharged water thus generated may be controlled to be discharged to the outside of the moving object 100 or to be stored in the storage unit 132, which is described below.

Then, in response to storage of the discharged water, the processor 128 may receive and set a utilization mode of utilization water based on an input of the user in order to use the discharged water for specific use. In response to storage of the discharged water, the processor 128 may set a target water temperature and a target water level of the utilization water according to the set utilization mode. The processor 128 may generate utilization water by adjusting a water temperature of utilization water based on a target water temperature by heat exchange between a component constituting the moving object and utilization water. Specifically, the processor 128 may adjust water temperature of utilization water by controlling a heating device or a cooling device according to whether a target water temperature range with a buffer temperature being added is satisfied based on a set target water temperature. The processor 128 may control the storage unit 132 to provide the utilization water through the provision unit 138 according to a set utilization mode. The component may be a component, which generates heat by its own operation, or a component for cooling or heating another element of the moving object 100.

The storage unit 132 according to the present disclosure may include a tank capable of storing water generated from a fuel cell. The storage unit 132 may separately store the water according to utilization purpose of utilization water through the processor 128.

The power consumption unit 134 may mean a heat converter such as a brake resister that is configured to consume excess power generated by reverse torque caused by regenerative braking and power generated from the fuel cell 104 as heat energy. Heat energy generated by the power consumption unit 134 may be consumed by the cooling unit 136. In relation to the present disclosure, the power consumption unit 134 may transfer heat energy to the storage unit 132 under control of the processor 128 or a motor control unit (MCU). Accordingly, it is possible to remove inefficient cooling logic of consuming heat energy, which the cooling unit 136 generates in the power consumption unit 134, and to increase heat management efficiency of a vehicle.

The cooling unit 136 may cool electronic equipment (for example, a fuel cell, a power conversion unit, a battery, and a storage unit) included in the moving object 100 through a cooling path. The cooling unit 136 may include an electric fan (EFAN), an electric hydraulic pump (EHP), a three-way valve (TWV), and an electric water pump (EWP) for cooling electronic equipment. In relation to the present disclosure, the cooling unit 136 may transfer waste heat of coolant during a cooling process to the storage unit 132 under control of the processor 128. Consequently, because no separate logic is implemented to absorb or remove heat energy transferred by coolant of the cooling unit and the heat energy is transferred to utilization water, heat management efficiency of a vehicle may be improved.

Figure 2:
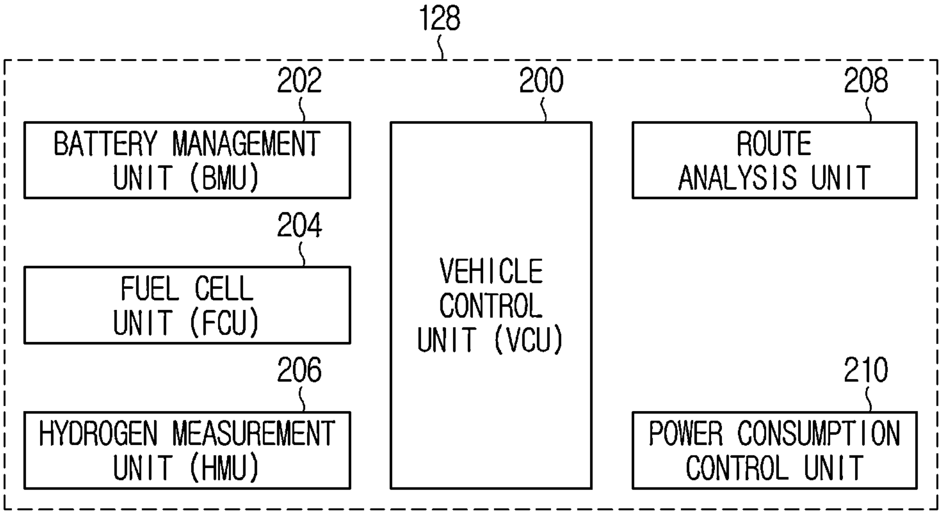
FIG. 2 is a schematic diagram illustrating modules included in a process according to an embodiment of the present disclosure.

The above-described processes of the processor 128 may be implemented by at least a part of the processor 128, which is described with respect to FIG. 2.

FIG. 2 is a schematic diagram illustrating modules included in a processor 128 according to an embodiment of the present disclosure.

The processor 128 may include a vehicle control unit (VCU) 200, a battery management unit (BMU) 202, a fuel cell unit (FCU) 204, a hydrogen measurement unit (HMU) 206, a route analysis unit 208, and a power consumption control unit 210. The processing or processes performed by the processor 128 described in FIG. 1 may be performed all or some of the above-described modules, and each of the modules may include an individual processor and an individual memory. The individual processor and the individual memory may constitute the processor 128 and the memory 126 according to the present disclosure. Each of the above-described components is not a necessary component, and one or more components may be omitted. In addition, other components apart from the above-described components may be included.

Specifically, the VCU 200 may receive a setting request for determining whether or not to store discharged water in the storage unit 132. Further, in response to storage of the discharge water, the VCU 200 may receive and set a utilization mode of utilization water based on an input of a user in order to use the discharged water as utilization water. The VCU 200 may set a target water temperature and a water level of the utilization water according to the set utilization mode. Specifically, the VCU 200 may adjust water temperature of utilization water by controlling a heating device or a cooling device according to whether a target water temperature range including an added buffer temperature is satisfied based on a set target water temperature and control the storage unit 132 to provide utilization water according to a set utilization mode through the provision unit 138.

The VCU 200 may collect information from each of the BMU 202, FCU 204, HMU 206, and route analysis unit 208 in order to adjust water temperature of utilization water and determine whether or not to operate a heating device based on the collected information.

For example, the VCU 200 may collect information on a charged amount of the battery 102 from the BMU 202 in order to heat utilization water using excess power. As an example, when a charged amount of the battery 102 exceeds a charge limit, the VCU 202 may control the power consumption control unit 210 to convert excess power generated by regenerative braking to heat energy and transfer the heat energy to the storage unit 132. A specific operation is described below.

As another example, in order to heat utilization water using power according to electricity generation of the fuel cell 104, the VCU 200 may collect the information on a charged amount, a power generation potential from the FCU 204, and a tank pressure from the HMU 206, that is, information on residual fuel. In addition, the VCU 200 may collect information on a route set in the moving object 200 from the route analysis unit 208. Accordingly, the VCU 200 may compare a power generation requirement for heating utilization water to a target water temperature and a power generation potential and determine whether or not to heat utilization water using the fuel cell 104 according to whether a power generation condition of the fuel cell is satisfied in consideration of a residual fuel amount and a feature of a route of the moving object 100. A specific operation is described below.

Hereinafter, the processing or processes performed by the processor 128 is described in detail through FIG. 3-FIG. 11, and for convenience of explanation, the description focuses on the processor 128 implementing the above-described configuration.

Figure 3:
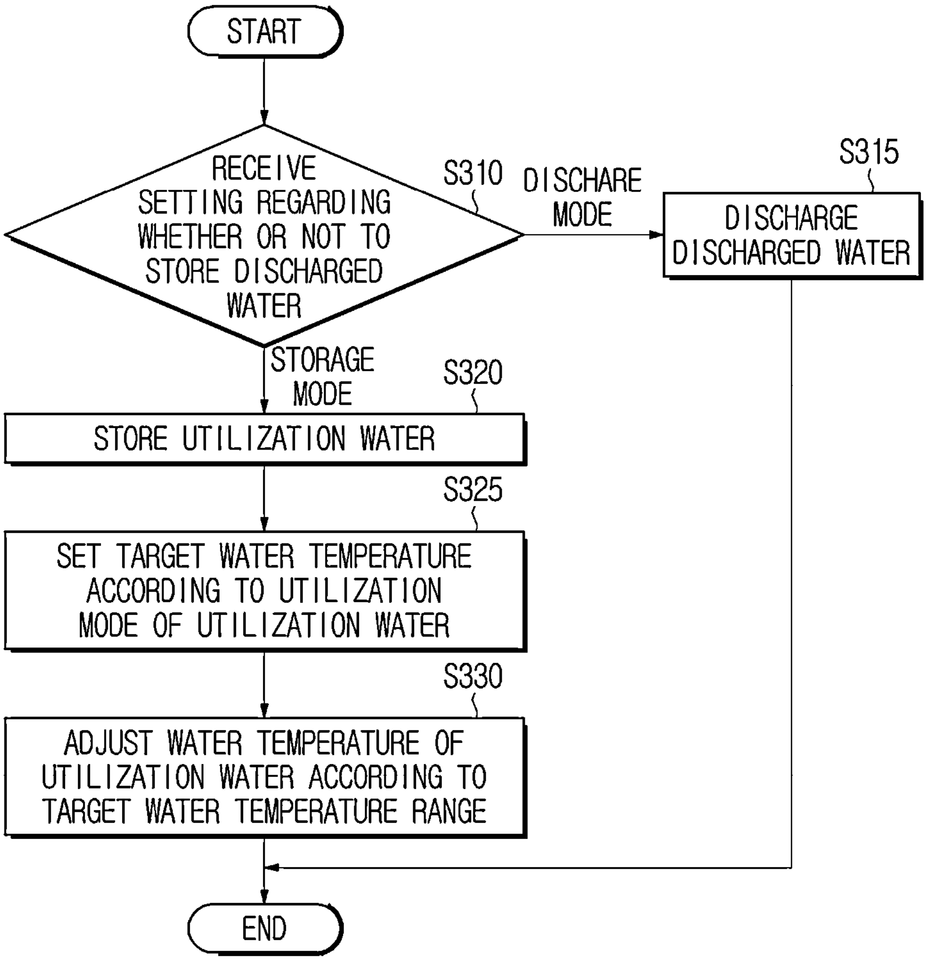
FIG. 3 is a flowchart illustrating a process of storing and managing utilization water according to an embodiment of the present disclosure.

FIG. 3 is a flowchart illustrating a process for storing and managing utilization water according to an embodiment of the present disclosure.

Discharged water is generated according to electricity generation of the fuel cell 104 of the moving object 100, and the processor 128 receives a setting regarding whether or not to store the discharged water (S310).

Specifically, the setting regarding whether or not to store may include a discharge mode for discharging the discharged water to the outside of the moving object 100 or a storage mode for storing the discharged water. As an example, the processor 128 may receive a setting request indicating whether or not to store discharged water according to a user input, and the storage mode for storing discharged water as utilization water (S320) or the discharge mode for discharging (S315) may be input.

According to another example, when a water level of utilization water stored in the storage unit 132 is equal to or below a target level (e.g., equal to or less than a target amount), the processor 128 stores the utilization water by setting the storage mode (S320). On the other hand, when the water level of the utilization water is above the target water level (e.g., greater than a target amount), the processor 128 may discharge the utilization water to the outside of the moving object by setting the discharge mode (S315). In another example, according to an embodiment of the present disclosure, when the storage mode or the discharge mode is received by a user input, the processor 128 may be controlled to store the utilization water above (e.g., in excess of) the target water level or to discharge the discharged water when the utilization water below the target water level by prioritizing the user input. The target water level may be set differently according to utilization mode settings of utilization water, which are described below.

Next, when the utilization water is stored, the processor 128 sets a target water temperature and a target water level according to a utilization mode of the utilization water (S325). The target water temperature and the target water level may be preset according to a utilization mode, and the utilization mode may be determined through a user input.

Specifically, the utilization mode may include a firefighter mode available in the event of fire or a water supply mode for supplying water to a driver. The utilization mode may be further divided according to a user setting and is not limited to the above-described examples.

According to an embodiment of the present disclosure, the processor 128 may instruct a user to set a target water temperature and a target water level when the firefighter mode and the water supply mode are set based on a user input. As another example, when the utilization mode is set, a corresponding value (e.g., target water temperature, target water level) may be automatically applied according to a preset target water temperature and a preset target water level.

Next, the processor 128 adjusts water temperature of the utilization water according to a target water temperature range using the cooling device or the heating device (S330). The target water temperature range is set based on the target temperature and may mean a temperature range that includes an added buffer temperature defined as a hysteresis value. According to an embodiment of the present disclosure, the buffer temperature may be set differently according to whether the utilization water is heated or cooled. A process of adjusting water temperature is described with reference to FIG. 5.

As the target water temperature range reflects or includes the buffer temperature in the target water temperature, the target water temperature range may serve as hysteresis for preventing chattering, when the water temperature of the utilization water is heated or cooled, and for absorbing noise of a water temperature value measured by the temperature sensor 122. The buffer temperature serves as hysteresis to absorb predetermined sensor and temperature error and thus may prevent system durability from being degraded as the cooling device and the heating device are repeatedly activated or deactivated.

Specifically, when the target water temperature is equal to or greater than the target water temperature range, the processor 128 may control the cooling unit 136 to absorb heat energy for cooling. When the target water temperature is below the buffer temperature, the processor 128 may control the power consumption unit 134 to use excess power obtained by electricity generation of the fuel cell 104 or regenerative braking for heating. Furthermore, the processor 128 may control the cooling unit 136 to heat utilization water using waste heat from a cooling process.

In the above-described heating method, the processor 128 may heat utilization water using any one of waste heat of coolant from a cooling process, regenerative waste heat generated from excess power generated by regenerative braking of a moving object, and fuel waste heat generated from power of a fuel cell.

Specifically, according to an embodiment of the present disclosure, the processor 128 may preferably or primarily use waste heat to heat utilization water instead of regenerative waste heat and fuel waste heat When it is predicted that a water temperature of the utilization water will not reach a target water temperature by waste heat, the processor 128 may also or additionally (e.g., secondarily) control the moving object 100 so as to heat the utilization water using at least one of the regenerative waste heat and the fuel waste heat. In addition, to use the regenerative waste heat, the processor 128 may determine whether the regenerative waste heat is available by analyzing a charge limit of the battery 102 and route information, and when the regenerative waste heat is available, the processor 128 heats the utilization water using the regenerative waste heat. Likewise, the processor 128 may consider a charged amount of the battery 102, the route information, a residual fuel amount of the fuel cell 104, and a power generation requirement for a target water temperature, and when at least one fuel cell power generation condition based on the above-described conditions or information is satisfied as a condition for utilizing the fuel waste heat, the processor 128 heats the utilization water using the fuel waste heat. When it is said that the processor 128 heats the utilization water using the regenerative waste heat and/or the fuel waste heat, it is meant that the processor 128 controls one or more components of the moving object 100 so as to heat the utilization water using the regenerative waste heat and/or the fuel waste heat.

According to another example, the processor 128 may opt to heat utilization water using excess power and/or to heat utilization water using electricity generation of the fuel cell according to an input of a user. In order to use a heating method thus opted, the processor 128 may consider information on a charged amount of the battery 102, a power generation potential, residual fuel, and a travel route. Specifically, for heating utilization water using excess power, the processor 128 may consider a charged amount and a charge limit of the battery 102 and route information, and for heating utilization water using electricity generation of the fuel cell 104, the processor 128 may determine whether or not to heat according to whether a condition for electricity generation of the fuel cell is satisfied based on information on a charged amount, a power generation potential, residual fuel, and a travel route. This is described below.

According to another example, the processor 128 may determine an order of priority of heating methods for heating the utilization water based on the above-described information and heat the utilization water according to the order of priority. For example, when a required time for reaching a target water temperature by heating utilization water using waste heat exceeds a predetermined time range or the target water temperature is predicted not to be reached (e.g., when heating using waste heat), regenerative waste heat may be set to be used for additional heating. In addition, heating by regenerative waste heat is performed when a charged amount of a battery exceeds a charge limit. When the battery is charged below the charge limit, the processor 128 may heat utilization water using fuel waste heat through the fuel cell 104. Likewise, when a required time for reaching the target water temperature by heating using regenerative waste heat exceeds the predetermined time range, it is predicted that the target water temperature will not be reached, or regenerative waste heat is not available, additional heating through or using the fuel cell 104 may be set. Furthermore, as for heating by the fuel cell 104, the processor 128 may determine whether or not to perform heating by fuel waste heat according to whether a condition for electricity generation of the fuel cell is satisfied, while no excess power is obtainable due to a parking state or impossibility of regenerative braking, a power generation potential from residual fuel is equal to or greater than a predetermined reference value, an ambient temperature and a coolant temperature are below a predetermined level, or a gradient of a route is being considered. An order of priority for heating methods is not limited to the above-described embodiments but instead may be variously set according to system modifications and/or requirements.

The processor 128 may provide a user with information regarding whether a water temperature of utilization water reaches a target water temperature or whether a target water level is reached. In addition, the processor 128 may calculate and provide a required time for reaching the target water temperature or the target water level to a user and thus provide a notification to help the user determine whether or not to operate a heating device (e.g., in addition to heating utilization water with waste heat).

Hereinafter, a process of determining a target water temperature according to each utilization mode of utilization water is described using FIG. 4.

Figure 4:
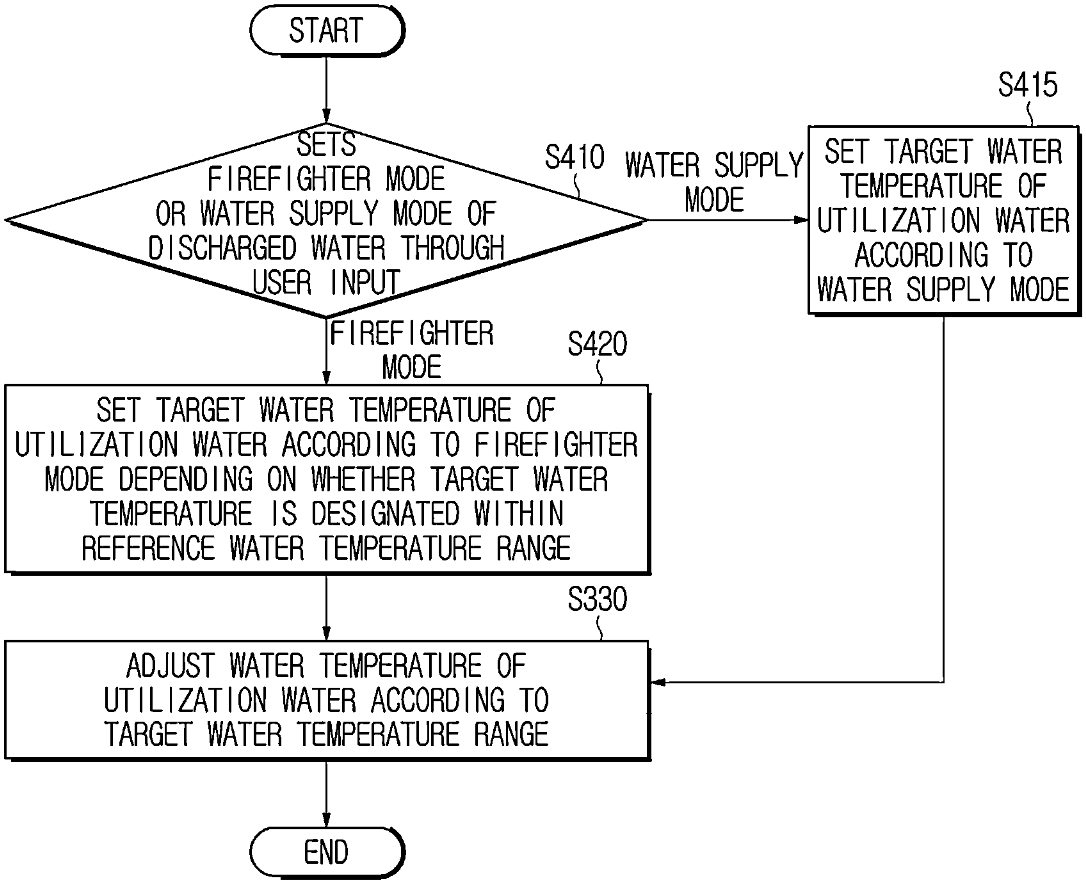
FIG. 4 is a flowchart illustrating a process of setting a target water temperature according to a utilization mode of utilization water according to an embodiment of the present disclosure.

FIG. 4 is a flowchart illustrating a process of setting a target water temperature according to a utilization mode of utilization water.

As discharged water is stored, the processor 128 sets a firefighter mode or a water supply mode of utilization water through a user input to use the discharged water as the utilization water for a specific use (S410). According to an embodiment of the present disclosure, the processor 128 may instruct a user to set a target water temperature. The target water temperature may be set differently according to the modes. According to another embodiment of the present disclosure, when the processor 128 receives the modes, the processor 128 may control a preset target water temperature value to be automatically applied and be modified later or control a preset value to be automatically applied when no target water temperature is set.

Specifically, in the case of the water supply mode, according to an embodiment, the processor 128 sets a target water temperature of the utilization water according to the water supply mode (S415). The target water temperature may be limited within a predetermined range and may be limited, for example, to temperatures between the freezing point and the boiling point of water.

Likewise, in the case of the firefighter mode, according to an embodiment, the processor 128 sets a target water temperature of the utilization water according to the firefighter mode depending on whether or not a target water temperature is designated within a reference water temperature range (S420). Water temperature should be maintained at an appropriate level in order to use the stored utilization water to fight or extinguish fires. The reference water temperature range (water temperature lower limit, water temperature upper limit) may be set accordingly. Specifically, when the firefighter mode is set according to a user input, the processor 128 may check whether a target water temperature is designated within the reference water temperature range according to the firefighter mode. When the target water temperature is designated within the reference water temperature range, the processor 128 sets the input target water temperature.

As an example, the reference water temperature range may be set to be a temperature above the freezing point of water or a temperature above room temperature where power consumption for cooling is minimized. However, the reference water temperature range is not limited thereto, but instead may be modified according to evaluation. A water temperature lower limit may be set to a value obtained by adding a marginal temperature (for example, 4 degrees) to the freezing point of water (for example, 0 degree).

Next, the processor 128 adjusts the water temperature of the utilization water according to a buffer temperature based on the target water temperature (S330). Specifically, when the target water temperature is equal to or above the reference water temperature including the buffer temperature, the processor 128 may control the cooling unit 136 to absorb heat energy for cooling the utilization water. When the target water temperature is below the reference water temperature including the buffer temperature, the processor 128 may adjust the water temperature by controlling the power consumption unit 134 to use fuel waste heat or regenerative waste heat generated by excess power obtained by electricity generation of the fuel cell 104 or regenerative braking for heating the utilization water. Furthermore, the processor 128 may control the cooling unit 136 to heat utilization water using waste heat from a cooling process.

Hereinafter, a process of heating or cooling utilization water according to a target water temperature range is described through FIG. 5.

Figure 5:
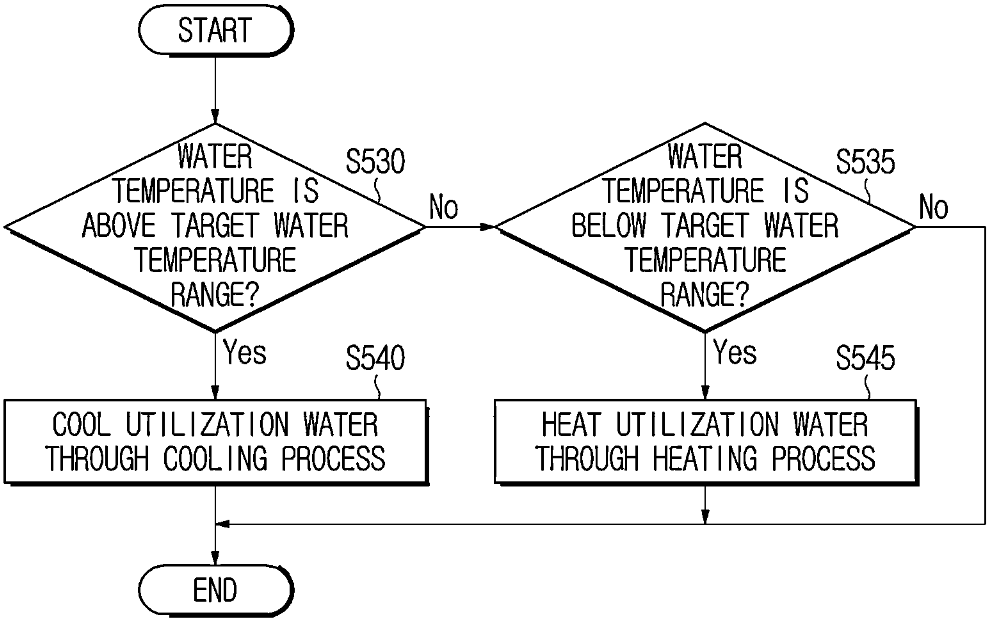
FIG. 5 is a flowchart illustrating a process for a condition of cooling and heating utilization water according to an embodiment of the present disclosure.

FIG. 5 is a flowchart illustrating a process for a condition of cooling and heating a water temperature of utilization water.

The processor 128 determines through the temperature sensor 122 whether a water temperature of utilization water is above or below a target water temperature range (S530, S540).

A buffer temperature, which is set based on the target temperature, may mean a value, for example, a value α, a value β, defined as a hysteresis value that absorbs or accounts for error according to water temperature measurement. According to an embodiment of the present disclosure, the buffer temperature may be set differently according to heating or cooling of the utilization water.

For example, as a condition for cooling the utilization water, an upper limit of the target water temperature range, which reflects or is adjusted to include the buffer temperature, may be set to a value that is obtained by adding the buffer temperature value a to the target temperature. Accordingly, when the water temperature of the utilization water is above the upper limit of the target water temperature range, the processor 128 cools the utilization water through the cooling process until the water temperature becomes lower than the upper limit of the target water temperature range (S540).

Likewise, as a condition for heating the utilization water, a lower limit of the target water temperature range, which reflects or is adjusted to include the buffer temperature, May be set to a value that is obtained by subtracting the buffer temperature value β from the target temperature. Accordingly, when the water temperature of the utilization water is below the lower limit of the target water temperature range, the processor 128 heats the utilization water through the cooling process until the water temperature becomes above the lower limit of the target water temperature range (S545). As described above, the buffer temperature may be set differently according to a condition for cooling or heating.

Hereinafter, a configuration of a cooling device included in the cooling unit 136 according to an embodiment of the present disclosure is described with reference to FIG. 6.

Figure 6:
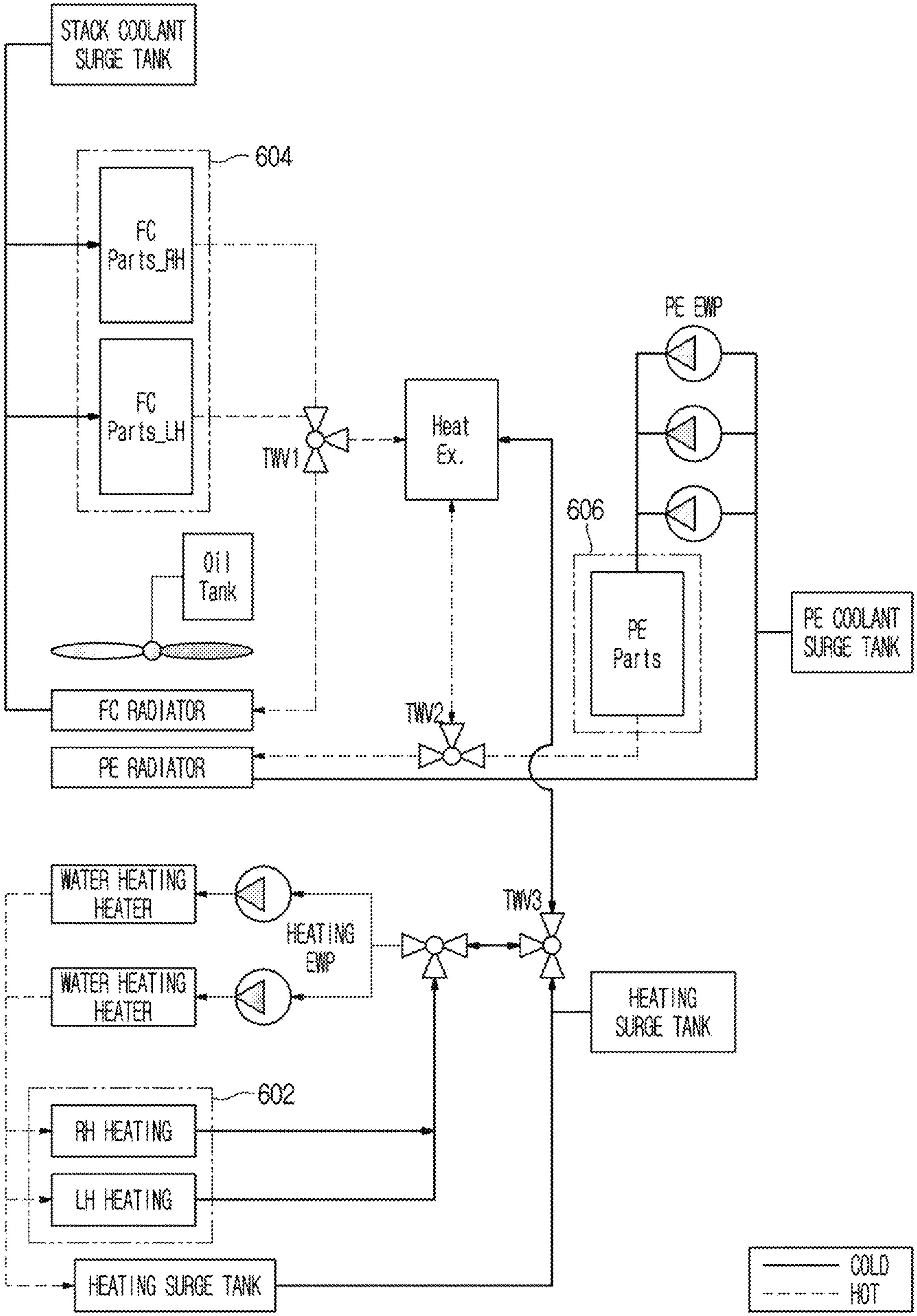
FIG. 6 is a view illustrating a configuration of a cooling device for heating or cooling water according to an embodiment of the present disclosure.

FIG. 6 is a view illustrating a configuration of a cooling device for heating or cooling utilization water thus adjusting water temperature.

A cooling device, which cools a component, may mean the cooling unit 136 according to an embodiment of the present disclosure. The configuration shown in FIG. 6 is an example of the cooling device and may be variously modified according to a system requirement and a specification. The cooling device may cool components constituting the moving object 100 through a cooling path. For example, the cooling device may cool a fuel cell module 602 including the fuel cell 104, a power electric module 606 including the battery 102, an air conditioner 602 including a heater, and the storage unit 132, and a coolant heated by the above-described component cooling may be cooled again through a cooling controller such as an EFAN, an EHP, and an EWP. Furthermore, according to an embodiment of the present disclosure, the cooling device may heat utilization water by transferring waste heat from a cooling process to the storage unit 132 through a heat exchanger.

The air conditioner 602 (for example, LH heating and RH heating in FIG. 6) may perform heating using a coolant that is heated by a water heating heater through control of a heating EWP, and the coolant may be cooled through a cooling and heating radiator. A cooling process for utilization water according to an embodiment of the present disclosure may be implemented by the same method as the above-described process.

In addition, the fuel cell module 604 (for example, FC Parts_LH (Fuel Cell Parts_Left Hand), FC Parts_RH (Fuel Cell Parts_Right Hand) may perform cooling using a coolant that is cooled by a fuel cell (FC) radiator and an EHP, and the coolant, which is heated and discharged after cooling, may provide heat energy to utilization water through a TWV and then a heat exchanger (Heat Ex In FIG. 6).

Likewise, the power electric module 606 (for example, PE Parts (Power Electric System Parts)) may perform cooling using a coolant that is cooled through an EWP, and the coolant, which is heated and discharged after cooling, may provide heat energy to utilization water through the TWV and then the heat exchanger. The power electric module 606 may include a battery module and provide heat energy of the coolant, which is cooled and discharged after cooling, to utilization water in the same method as the above-described process. A heating process using waste heat from a cooling process according to an embodiment of the present disclosure may be implemented by the above-described process.

Next, a process of heating utilization water using excess power and heating utilization water using electricity generation of the fuel cell 104 is described with reference to FIG. 7.

Figure 7:
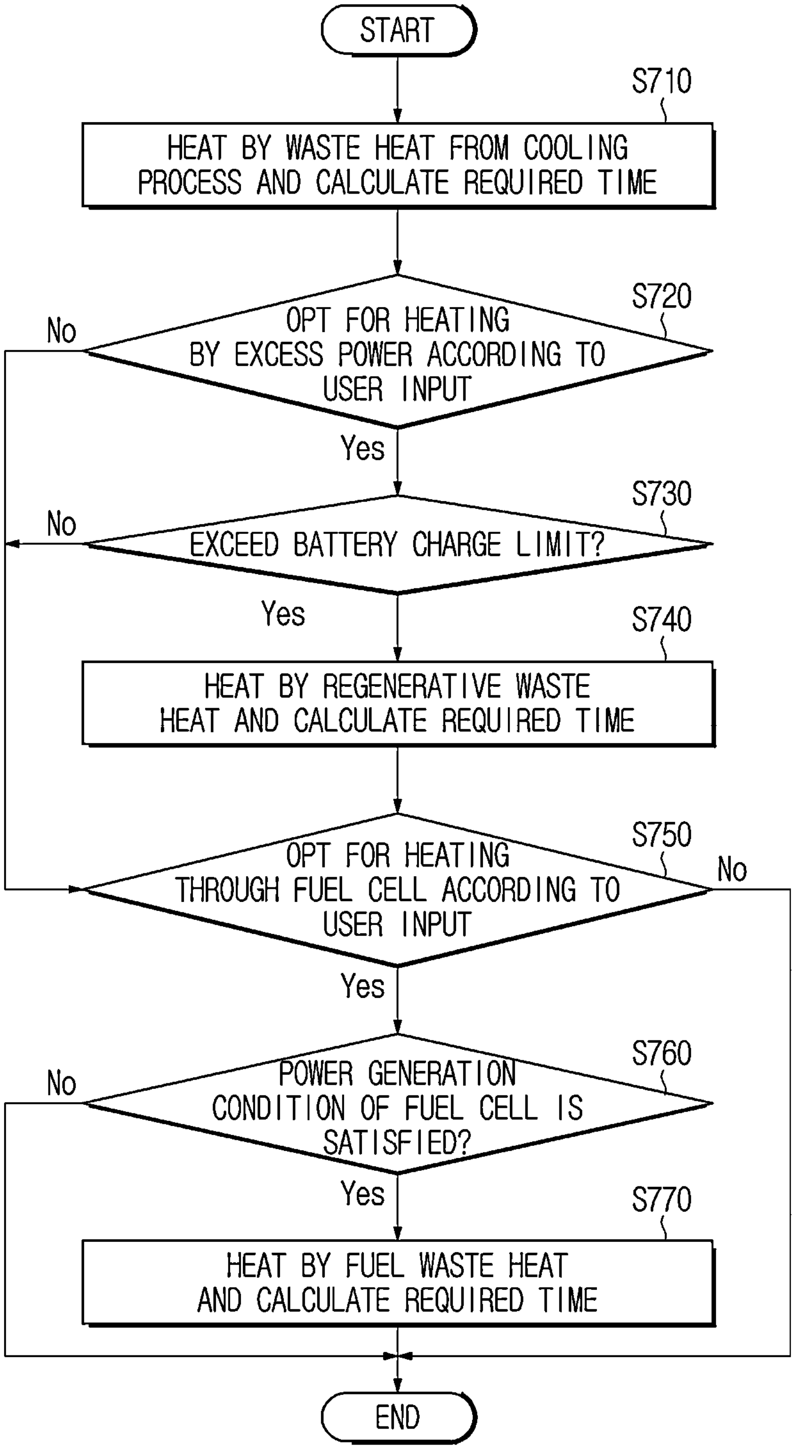
FIG. 7 is a flowchart illustrating a heating process for heating water according to a user input according to an embodiment of the present disclosure.

FIG. 7 is a flowchart illustrating a heating process for heating utilization water according to a user input.

Referring to FIG. 7, first, the processor 128 performs heating using waste heat from a cooling process and calculates a required time to heat the utilization water (S710). Specifically, the processor 128 may be controlled to first perform heating using waste heat to achieve a target water temperature according to a utilization mode setting of a user and calculate and provide a corresponding required time to heat the utilization water to the user (S710).

According to an embodiment of the present disclosure, the user may recognize or receive the required time calculated by the processor 128 through a notification received from a visual or audio means (e.g., from a visual device such as a display, from an audio device such as a speaker), and the processor 128 may instruct the user to opt for heating by regenerative waste heat from excess power or heating by fuel waste heat from a fuel cell.

First, according to an embodiment of the present disclosure, the processor 128 may receive user option information including information on selection of a heating option provided to the user to heat utilization water using regenerative waste heat or to heat utilization water using excess power according to a user input (S720). Alternatively, on the contrary, the processor 128 may instruct the user to opt for heating through the fuel cell 104 when the user's input does not opt for heating by excess power. According to the present disclosure, an order of options for heating by excess heating and heating through a fuel cell may be changed or switched according to a system setting.

In addition, according to an embodiment of the present disclosure, the processor 128 may be configured to systematically perform additional heating using regenerative waste heat when it is predicted that a water temperature of utilization water will not reach a target temperature when heated using waste heat or when a required time for reaching the target water temperature exceeds a predetermined time range or threshold.

First, the processor 128 may consider a charge limit of the battery 102 when determining whether to perform heating using regenerative waste heat from excess power according to step S720 (S730). In addition, the processor 128 may also consider information on a travel route.

Specifically, when heating using excess power is performed optionally or systematically according to a request of the user, the processor 128 compares a charged state of the battery 102 and the charge limit. For example, when a charged amount of the battery 102 is below a preset charge limit, the processor 128 does not perform heating using regenerative waste heat but instead provides a notification such as warning that a charged amount of battery is not sufficient. As an example, when the charge limit is set to 80% of the charge potential of the battery 102 and the charged amount of the battery 102 is below 80% of the charge potential, the processor 128 may charge the battery 102 in preference to or instead of performing heating using regenerative waste heat. Likewise, even when additional heating is systematically performed using regenerative waste heat, the above-described condition is considered.

As another example, unlike the above-described example, when heating using excess power is opted for or selected by a user request, the processor 128 may preferably heat utilization water even when the charged amount of the battery 102 is below the charge limit. An order of priority for heating using regenerative waste heat or charging of the battery 102 may be changed according to a user setting, and a method of setting the order of priority is not limited to the above-described example.

Next, according to an embodiment of the present disclosure, when the charged amount of the battery 102 exceeds the charge limit, the processor 128 may heat utilization water using regenerative waste heat from regenerative braking and calculate and provide a corresponding required time to heat the utilization water to the user (S740).

According to an example, as described in FIG. 1, the processor 128 may convert excess power generated by reverse torque generated by regenerative braking into heat energy and transfer the heat energy to utilization water.

Furthermore, the processor 128 considers route information of the moving object 100 in order to determine whether or not to receive excess power generated by regenerative braking. In other words, the processor 128 may analyze the route information and the charge limit of the battery to determine whether to heat utilization water using regenerative waste heat by generating excess power from regenerative braking.

Specifically, in order to determine whether or not to heat utilization water using regenerative waste heat, the processor 128 may analyze whether a gradient of a route set for the moving object 100 satisfies a preset condition for generating excess power from regenerative braking, that is, whether the gradient decreases over a predetermined section (e.g., of the route).

In addition, the user may recognize or receive the required time calculated by the processor 128 through a notification received from a visual or audio means (e.g., from a visual device such as a display, from an audio device such as a speaker), and the processor 128 may instruct the user to opt for heating through the fuel cell 104 (S750). In other words, the processor 128 may receive information on the user's selection to heating utilization water using fuel waste heat through the fuel cell 104 and heat the utilization water. Alternatively, on the contrary, the processor 128 does not perform an additional heating process using fuel waste heat when the user's input does not opt for heating using the fuel cell 104.

In addition, according to an embodiment of the present disclosure, the processor 128 may be configured to systematically perform additional heating using fuel waste heat when it is predicted that a water temperature of utilization water will not reach a target temperature when heated using regenerative waste heat or when a required time for reaching the target water temperature exceeds a predetermined time range.

First, according to step S750, the processor 128 may examine whether a power generation condition of fuel cell is satisfied in order to perform heating by the fuel cell 104 (S760).

Specifically, as for the power generation condition of fuel cell, the processor 128 may consider information on a charged amount, a power generation potential of the fuel cell 104, a residual fuel amount, and information on a route set in the moving object 100 but is not limited thereto and may consider any information based on the power generation of the fuel cell 104. When at least one of the power generation conditions of fuel cell is satisfied as a condition for utilizing fuel waste heat, the processor 128 heats utilization water using the fuel waste heat.

As an example, when the charged amount of the battery is below the charge limit or the residual fuel amount is below a predetermined reference value, the processor 128 may not perform power generation of the fuel cell. As another example, the processor 128 may determine whether or not to perform power generation of the fuel cell by considering route information of the moving object 100, for example, a gradient of a route. As an example, by analyzing a route set in the moving object 100, the processor 128 may not perform power generation of the fuel cell when the road on the route is highly congested or a downhill route is below a predetermined criterion.

The processor 128 may determine whether or not to perform power generation from the fuel cell 104 by considering waste heat of a coolant and regenerative waste heat as a condition for the power generation of the fuel cell. Specifically, only when a vehicle stops or an analysis result of the route reveals that the road is so congested that no excess power is obtained from regenerative braking, the processor 128 may perform heating by the power generation of the fuel cell 104. In addition, the processor 128 may perform heating by the power generation of the fuel cell 104 only when available waste heat of the coolant and regenerative waste heat are less than energy required for reaching the target water temperature.

According to the present disclosure, a condition for power generation of a fuel cell is not limited to the above-described example, and any information related to the fuel cell 104 may be considered. Likewise, the above-described conditions may also be considered when fuel waste heat is systematically used for heating.

As another example, unlike the above-described example, when heating by the fuel cell 104 is opted by a user request, the processor 128 may preferably heat utilization water even when the condition for power generation of the fuel cell is not satisfied. An order of priority for heating utilization water using the fuel cell 104 or the condition for power generation of the fuel cell may be changed according to a user setting, and a method of setting the order of priority is not limited to the above-described example.

Next, according to an embodiment of the present disclosure, when the condition for the power generation of the fuel cell is satisfied, the processor 128 heats utilization water through fuel waste heat and calculates and provides a corresponding required time to the user (S770).

Hereinafter are described heat energy transfer for heating utilization water using waste heat of coolant, regenerative waste heat and fuel waste heat through FIG. 8.

Figure 8:
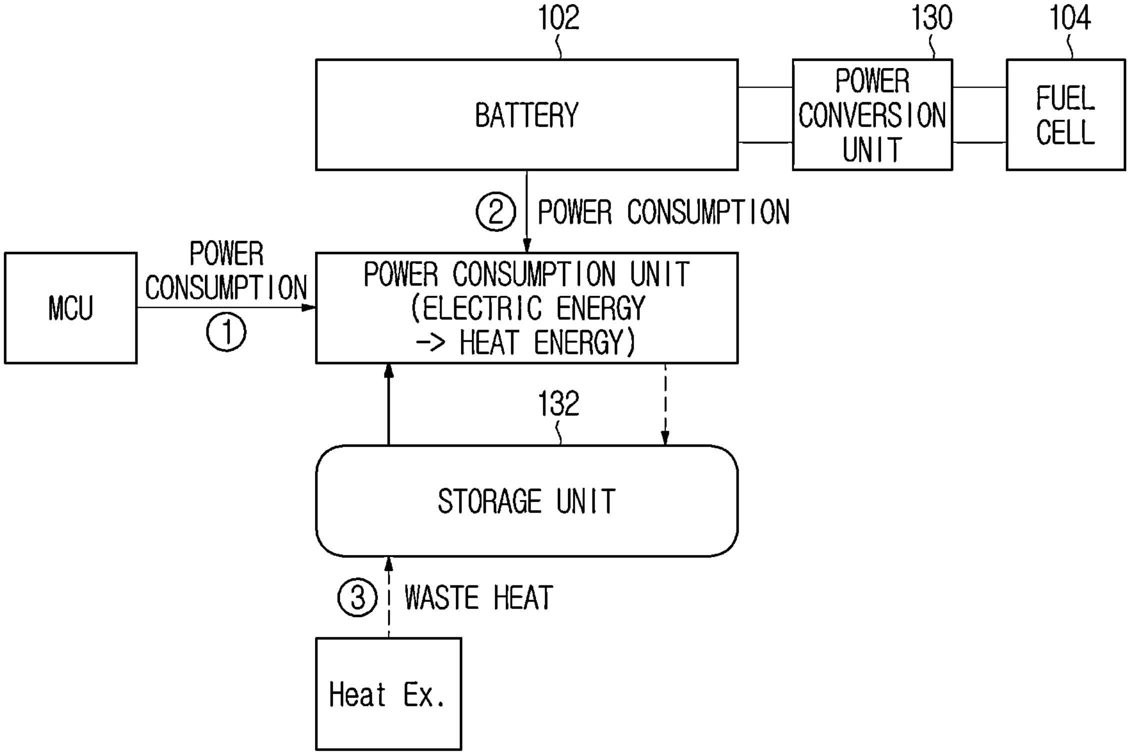
FIG. 8 is a mimetic diagram illustrating heat energy transfer for heating utilization water according to an embodiment of the present disclosure.

FIG. 8 is a mimetic diagram illustrating heat energy transfer for heating utilization water.

Excess power (① of FIG. 8) from regenerative braking is changed to regenerative waste heat, which is heat energy, through the power consumption unit 134 and is transferred to utilization water. Likewise, heating by the fuel cell 104 may be converted at a high voltage by a fuel cell DC-DC converter (FDIC), and power (② of FIG. 8) may be provided to the power consumption unit 134 through the battery 102 and be transferred to utilization water as fuel waste heat that is heat energy. Waste heat of a coolant may be provided to utilization water as heat energy through a heat exchanger (③ of FIG. 8).

The processor 128 may control the fuel cell 104, the power consumption unit 130 and the battery 102 and adjust power applied to the power consumption unit 134 to achieve a target water temperature. Likewise, the processor 128 may control a motor control unit (MCU), which is a motor control module, and adjust excess power applied to the power consumption unit 134. In addition, the processor 128 may control the cooling unit 136 and adjust heat energy transferred to the storage unit 132 through the heat exchanger.

Hereinafter, a process of providing utilization water according to a utilization mode is described through FIG. 9.

Figure 9:
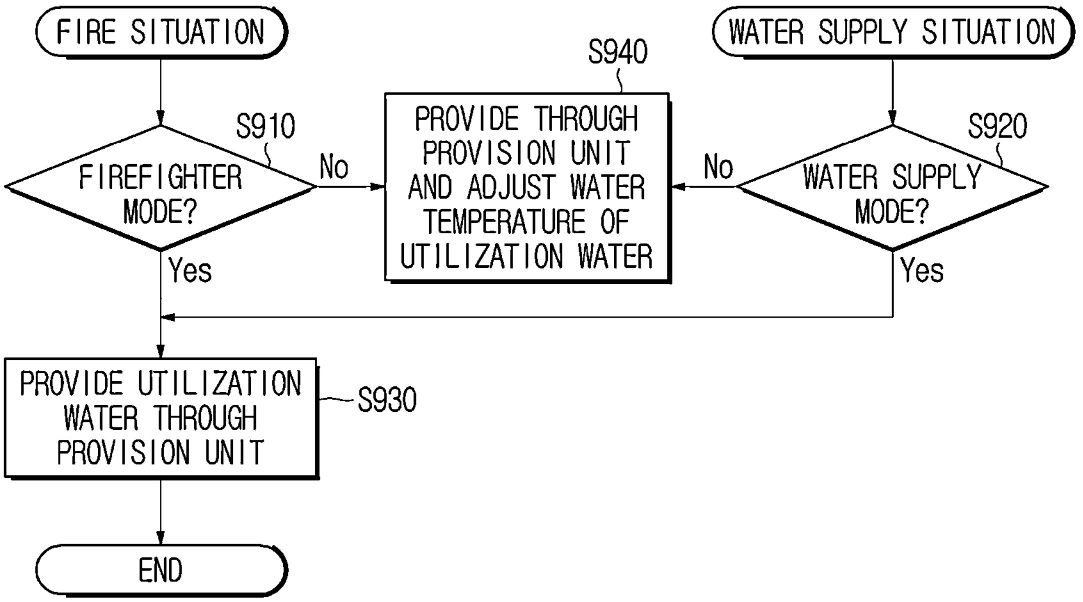
FIG. 9 is a flowchart illustrating a process of providing utilization water according to utilization modes according to an embodiment of the present disclosure.

FIG. 9 is a flowchart illustrating a process of providing utilization water according to utilization modes.

When providing utilization water according to a set utilization mode, the processor 128 provides the utilization water through the provision unit 138. Specifically, the processor 128 determines whether or not to provide the utilization water according to a utilization mode (S910, S920).

As an example, when a firefighter mode is set, when a fire or a collision occurs, the utilization water may be sprayed through the provision unit 138 such as a sprinkler and a hydrant (S930). The provision unit 138 according to the firefighter mode is not limited to the above-described example but may include any water spray device used to extinguish fire.

Likewise, when a user requests water supply according to a water supply mode, the utilization water may be provided to the user through the provision unit 138 such as a water supply device, a water purifier, and a water supply facility (S930). The provision unit 138 according to the water supply mode is not limited to the above-described example but may include any water supply device provided for user convenience.

As the utilization water is provided to the user, the processor 128 may provide information on residual utilization water. In addition, information on water temperature of the utilization water may also be provided.

On the other hand, when the processor 128 provides the utilization water according to a different mode from a set utilization mode, the processor 128 may set a target water temperature and a target water level according to the different mode from the set utilization mode, while providing the utilization water, and control a heating device and a cooling device accordingly and adjust the water temperature of the utilization water (S940). When the target water temperature and the target water level of the different mode are preset, the processor 128 may skip the process of setting the target water temperature and the target water level and adjust the water temperature and water level of the utilization water according to the preset target water temperature and target water level.

According to an embodiment of the present disclosure, when the utilization water stored according to the water supply mode is to be provided according to the firefighter mode through the provision unit 138, the processor 128 may set a target water temperature and a target water level according to the firefighter mode, while providing the utilization water, and adjust the water temperature of the utilization water accordingly. Likewise, when the utilization water stored according to the firefighter mode is provided according to the water supply mode through the provision unit 138, the utilization water may also be provided by the same method as the above-described process.

Hereinafter, an embodiment of separately storing utilization water in the storage unit according to storage mode is described through FIG. 10.

Figure 10:
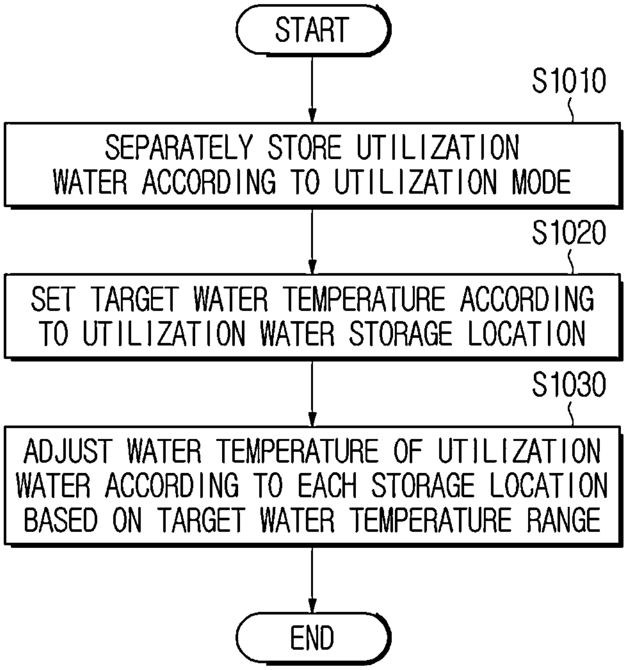
FIG. 10 is a flowchart illustrating a process of storing and managing utilization water according to another embodiment of the present disclosure.

FIG. 10 is a flowchart illustrating a process of storing and managing utilization water according to another embodiment of the present disclosure.

According to another embodiment of the present disclosure, based on storage mode where utilization water is stored, the processor 128 selects a storage location of the utilization water according to a set utilization mode and separately stores the utilization water (S1010).

For example, as the storage mode of storing the utilization water is assumed to be received, the processor 128 controls the utilization water to be separately stored according to the firefighter mode and the water supply mode.

Next, the processor 128 sets a target water temperature and a target water level according to a utilization water storage location (S1020). The target water temperature and the target water level may be preset according to a utilization mode, and the utilization mode may be determined through a user input. Specifically, the utilization mode may include the firefighter mode available in the event of fire or the water supply mode for supplying water to a driver. The utilization mode may be further divided according to a user setting and is not limited to the above-described example.

According to another embodiment of the present disclosure, the processor 128 may instruct a user to set a target water temperature and a target water level according to each storage location of the utilization water based on a user input. In addition, a corresponding value may be automatically applied according to each storage location based on a utilization mode, a preset target water temperature and a preset target water level.

Accordingly, when a water level of the utilization water stored in the storage unit 132 is equal to or below the target level, the processor 128 may automatically store the utilization water according to a storage location of the utilization water. On the other hand, when the water level of the utilization water is above the target water level, the processor 128 may automatically discharge the utilization water to the outside of the moving object 100 by setting the discharge mode. As another example, when the storage mode or the discharge mode is selected by a user request, the processor 128 may be controlled to store the utilization water above the target water level or to discharge the utilization water below the target water level by making the user input a priority. The target water level may be set differently according to each storage location based on a utilization mode setting of the utilization water.

Next, based on or using heat exchange between components constituting the moving object 100 and the utilization water, the processor 128 adjusts the water temperature of the utilization water according to each storage location based on a target water temperature range (S1030). The process of adjusting the water temperature is actually the same as the process described in FIGS. 3-8.

While the methods of the present disclosure described above are represented as a series of operations for clarity of description, it is not intended to limit the order in which the steps are performed. The steps described above may be performed simultaneously or in different order as necessary. In order to implement the method according to the present disclosure, the described steps may further include different or other steps, may include remaining steps except for some of the steps, or may include other additional steps except for some of the steps.

The various embodiments of the present disclosure do not disclose a list of all possible combinations and are intended to describe representative aspects of the present disclosure. Aspects or features described in the various embodiments may be applied independently or in combination of two or more.

In addition, various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for managing discharged water discharged by a moving object, the method comprising:

receiving a setting request indicating whether or not to store the discharged water that is discharged due to electricity generation of a fuel cell;

receiving, in response to storing the discharged water, a utilization mode for using the discharged water as utilization water for a specific use;

setting a target water temperature of the utilization water based on the received utilization mode;

adjusting a water temperature of the utilization water based on the target water temperature through heat exchange between a component constituting the moving object and the utilization water; and providing the utilization water according to the received utilization mode.

2. The method of claim 1, wherein receiving the setting request indicating whether or not to store the discharged water sets a discharge mode for discharging the discharged water to an outside of the moving object or a storage mode for storing the discharged water in a storage unit according to a user input.

3. The method of claim 1, wherein receiving the utilization mode comprises receiving a user input and setting a firefighter mode or a water supply mode.

4. The method of claim 3, wherein setting the target water temperature comprises:

checking whether or not the target water temperature is within a reference water temperature range of the utilization water according to the firefighter mode, when the firefighter mode is set according to the user input; and setting the target water temperature according to the user input, when the target water temperature is within the reference water temperature range.

5. The method of claim 1, wherein adjusting the water temperature of the utilization water comprises adjusting the water temperature based on a target water temperature range that is generated by adding a buffer temperature set based on the target water temperature, and wherein the buffer temperature is defined as a hysteresis value that absorbs error according to a water temperature measurement.

6. The method of claim 1, wherein adjusting the water temperature of the utilization water comprises heating the utilization water using one of waste heat of a coolant from a cooling process of the component constituting the moving object, regenerative waste heat generated from excess power generated by regenerative braking of the moving object, or fuel waste heat generated from power generated by the fuel cell.

7. The method of claim 6, wherein the utilization water is heated by the waste heat and when it is predicted that the water temperature will not reach the target water temperature by being heated by the waste heat, the utilization water is also heated using at least one of the regenerative waste heat and the fuel waste heat.

8. The method of claim 6, wherein heating the utilization water by the regenerative waste heat includes:

determining whether or not the regenerative waste heat is available for heating the utilization water by analyzing at least one of a battery charge limit of the moving object and route information of the moving object; and when the regenerative waste heat is available, heating the utilization water using the regenerative waste heat.

9. The method of claim 6, wherein heating the utilization water by the fuel waste heat includes heating the utilization water using the fuel waste heat when at least one of a plurality of fuel cell power generation conditions, which are based on a battery charge amount of the moving object, route information of the moving object, a residual fuel amount of the fuel cell, or a power generation requirement up to the target water temperature, is satisfied as a condition for utilizing the fuel waste heat.

10. The method of claim 6, wherein heating the utilization water further comprises calculating a required time to heat the utilization water according to heating by one of the waste heat, the excess power, and the power generated by the fuel cell.

11. The method of claim 6, wherein heating the utilization water further comprises receiving user option information regarding heating by the excess power and heating by the power generated by the fuel cell.

12. The method of claim 1, wherein providing the utilization water according to the utilization mode further comprises:

providing the utilization water in a different mode, when the utilization water is provided according to the different mode from the received utilization mode; and adjusting the water temperature of the utilization water, which remains without being discharged in the different mode, according to the target water temperature through an operation of the component constituting the moving object or the heat exchange.

13. A mobility device for managing discharged water discharged by a moving object, the device comprising:

a memory configured to store at least one instruction; and a processor configured to execute the at least one instruction stored in the memory based on data obtained from the memory, wherein the processor is further configured to receive a setting request indicating whether or not to store discharged water that is discharged due to electricity generation of a fuel cell, receive, in response to storing the discharged water, a utilization mode for using the discharged water as utilization water for a specific use, set a target water temperature of the utilization water based on the received utilization mode, adjust a water temperature of the utilization water based on the target water temperature through heat exchange between a component constituting the moving object and the utilization water, and provide the utilization water according to the received utilization mode.

14. The mobility device of claim 13, wherein the processor is further configured to receive a user input and set a firefighter mode or a water supply mode.

15. The mobility device of claim 14, wherein the processor is further configured to:

check whether or not the target water temperature is within a reference water temperature range of the utilization water according to the firefighter mode, when the firefighter mode is set according to the user input; and set the target water temperature according to the user input, when the target water temperature is within the reference water temperature range.

16. The mobility device of claim 13, wherein the processor is further configured to adjust the water temperature based on a target water temperature range that is generated by adding a buffer temperature set based on the target water temperature, and wherein the buffer temperature is defined as a hysteresis value that absorbs error according to a water temperature measurement.

17. The mobility device of claim 13, wherein the processor is further configured to heat the utilization water using one of waste heat of a coolant from a cooling process of the component constituting the moving object, regenerative waste heat generated from excess power generated by regenerative braking of the moving object, or fuel waste heat generated from power generated by the fuel cell.

18. The mobility device of claim 17, wherein the utilization water is heated by the waste heat, and when it is predicted that the water temperature will not reach the target water temperature by being heated by the waste heat, the utilization water is also heated using at least one of the regenerative waste heat and the fuel waste heat.

19. The mobility device of claim 17, wherein in heating the utilization water by the regenerative waste heat, the processor determines whether or not the regenerative waste heat is available for the heating by analyzing at least one of a battery charge limit of the moving object and route information of the moving object, and wherein, when the regenerative waste heat is available, the utilization water is heated using the regenerative waste heat.

20. The mobility device of claim 17, wherein in heating the utilization water by the fuel waste heat, the utilization water is heated using the fuel waste heat when the processor determines whether at least one of a plurality of fuel cell power generation conditions, which are based on a battery charge amount of the moving object, route information of the moving object, a residual fuel amount of the fuel cell, or a power generation requirement up to the target water temperature, are satisfied as a condition for utilizing the fuel waste heat.

* * * * *